US012346053B2

(12) United States Patent
Yamamoto et al.

(10) Patent No.: US 12,346,053 B2
(45) Date of Patent: Jul. 1, 2025

(54) IMAGE FORMING APPARATUS WITH FIRST AND SECOND COUPLINGS FOR TRANSMISSION OF A ROTATIONAL DRIVE FORCE TO A UNIT ATTACHABLE AND DETACHABLE THEREFROM

(71) Applicant: CANON KABUSHIKI KAISHA, Tokyo (JP)

(72) Inventors: Shinkichi Yamamoto, Shizuoka (JP); Hiroshi Kawamura, Shizuoka (JP); Yuta Kawaguchi, Shizuoka (JP); Hideto Chino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/464,143

(22) Filed: Sep. 8, 2023

(65) Prior Publication Data

US 2024/0103422 A1 Mar. 28, 2024

(30) Foreign Application Priority Data

Sep. 26, 2022 (JP) ................................. 2022-152609

(51) Int. Cl.

*G03G 15/00* (2006.01)
*G03G 21/16* (2006.01)
*G03G 21/18* (2006.01)

(52) U.S. Cl.

CPC ....... *G03G 15/757* (2013.01); *G03G 21/1623* (2013.01); *G03G 21/1647* (2013.01); *G03G 21/186* (2013.01); *G03G 2221/1657* (2013.01)

(58) Field of Classification Search

CPC ............ G03G 15/757; G03G 21/1623; G03G 21/1647; G03G 21/1857; G03G 21/186; G03G 15/1615; G03G 2221/1657

See application file for complete search history.

(56) References Cited

U.S. PATENT DOCUMENTS 6,035,159 A * 3/2000 Azuma ................ G03G 21/186 399/167
6,163,665 A * 12/2000 Watanabe ............ G03G 21/186 399/111
9,268,293 B2 2/2016 Nakao et al. .......... G03G 15/08
9,690,252 B2 6/2017 Kusano et al. ........ G03G 21/16

(Continued)

FOREIGN PATENT DOCUMENTS

JP 2020-170045 10/2020

*Primary Examiner* — Stephanie E Bloss
*Assistant Examiner* — Laura Roth
(74) *Attorney, Agent, or Firm* — Venable LLP

(57) ABSTRACT

An image forming apparatus includes an apparatus body including a drive source, a rotary member, and a first coupling movable in an axial direction with respect to the rotary member, and a unit attachable to and detachable from the apparatus body, the unit including a second coupling configured to receive the driving force by engaging with the first coupling. The rotary member includes an abutting portion. The first coupling includes an abutted portion configured to be abutted with the abutting portion, and is configured to rotate in the first rotation direction together with the rotary member in a case where the abutting portion presses the abutted portion. The apparatus body further includes a first urging member configured to urge the first coupling in a second rotation direction opposite to the first rotation direction.

24 Claims, 10 Drawing Sheets

(56) References Cited

U.S. PATENT DOCUMENTS

| | | | | |
|---|---|---|---|---|
| 10,704,610 | B2 | 7/2020 | Chino | F16D 13/16 |
| 10,920,863 | B2 | 2/2021 | Chino | F16H 27/08 |
| 11,106,160 | B2 | 8/2021 | Chino | G03G 15/00 |
| 11,409,225 | B2 | 8/2022 | Kawaguchi et al. | G03G 21/00 |
| 11,609,529 | B2 | 3/2023 | Kawaguchi et al. | G03G 21/00 |
| 2010/0296841 | A1 * | 11/2010 | Yuasa | G03G 21/1647 399/167 |
| 2011/0103812 | A1 * | 5/2011 | Takasaka | G03G 15/0121 399/227 |
| 2013/0302066 | A1 * | 11/2013 | Kawai | G03G 21/1647 399/167 |
| 2018/0329339 | A1 * | 11/2018 | Nieda | G03G 15/0865 |
| 2020/0301352 | A1 * | 9/2020 | Matsumaru | G03G 15/757 |
| 2021/0223734 | A1 * | 7/2021 | Niikawa | G03G 15/5008 |
| 2023/0077968 | A1 * | 3/2023 | McDaniel | F16D 7/00 399/286 |

* cited by examiner

IMAGE FORMING APPARATUS WITH FIRST AND SECOND COUPLINGS FOR TRANSMISSION OF A ROTATIONAL DRIVE FORCE TO A UNIT ATTACHABLE AND DETACHABLE THEREFROM

BACKGROUND OF THE INVENTION

Field of the Invention

The present invention relates to an image forming apparatus that forms an image on a recording material.

Description of the Related Art

Conventionally, an image forming apparatus including a unit such as a process cartridge attachable to and detachable from an apparatus body of the image forming apparatus is known. Japanese Patent Laid-Open No. 2020-170045 discloses a configuration in which a coupling portion on the apparatus body side and a gear portion that receives a driving force from a drive source inside the apparatus body are formed as separate members, and at the time of replacement of a cartridge, only the coupling portion moves to disengage from a coupling on the cartridge side.

However, in a configuration in which a coupling is movable with respect to a gear portion (rotary member), the coupling and the gear portion are sometimes configured such that a gap occurs in the rotation direction.

SUMMARY OF THE INVENTION

The present invention provides an image forming apparatus capable of more stable drive transmission.

According to one aspect of the invention, an image forming apparatus includes an apparatus body including a drive source configured to supply a driving force, a rotary member configured to be rotated in a first rotation direction about a rotation axis by the driving force, and a first coupling rotatable about the rotation axis and movable in an axial direction of the rotation axis with respect to the rotary member, and a unit attachable to and detachable from the apparatus body, the unit including a second coupling configured to receive the driving force by engaging with the first coupling, wherein the rotary member includes an abutting portion, wherein the first coupling includes an abutted portion configured to be abutted with the abutting portion, and is configured to rotate in the first rotation direction together with the rotary member in a case where the abutting portion presses the abutted portion, and wherein the apparatus body further includes a first urging member configured to urge the first coupling in a second rotation direction opposite to the first rotation direction.

Further features of the present invention will become apparent from the following description of exemplary embodiments with reference to the attached drawings.

DESCRIPTION OF THE EMBODIMENTS

Embodiments of the present disclosure will be described below with reference to drawings.

First Embodiment

Figure 1:
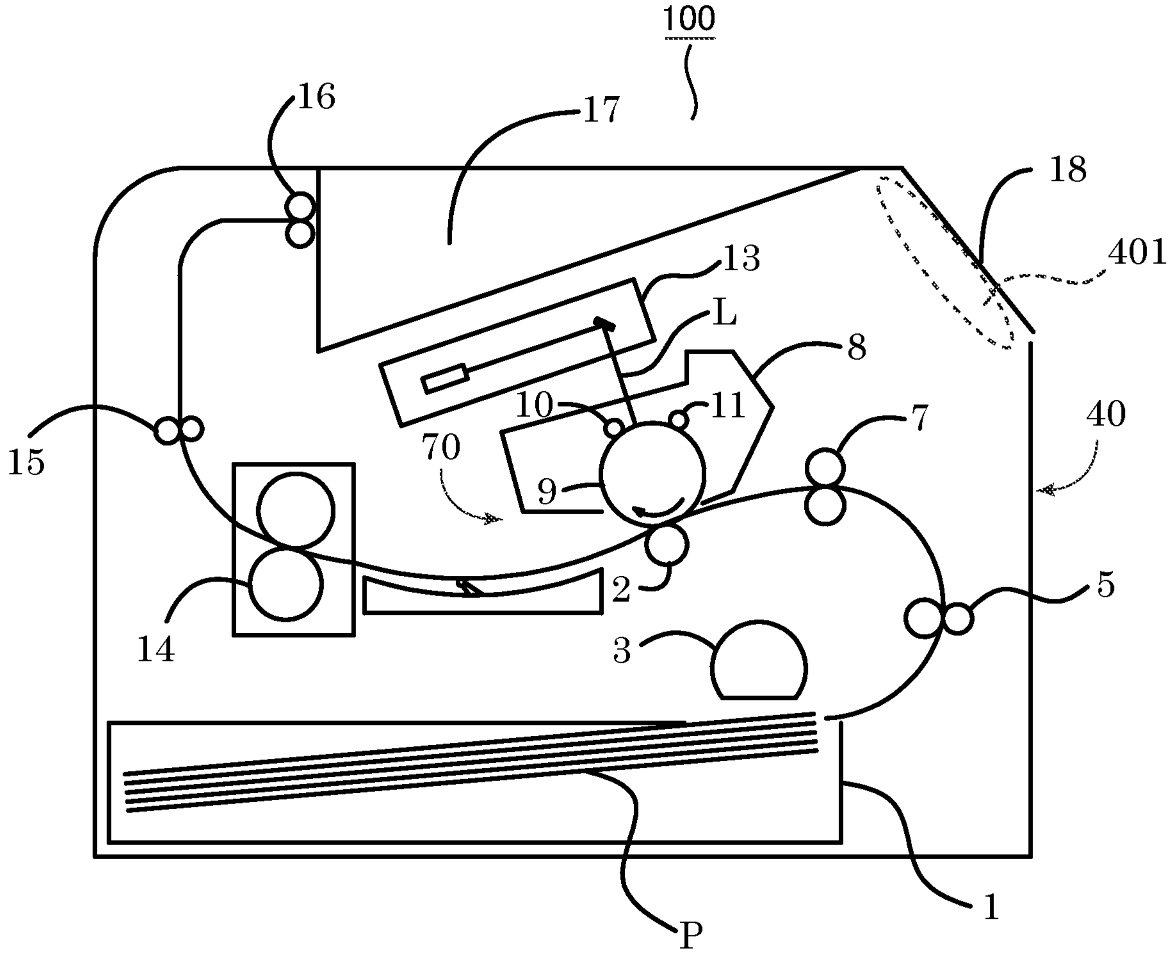
FIG. 1 is a schematic view of an image forming apparatus according to a first embodiment.

An image forming apparatus 100 according to a first embodiment will be described. FIG. 1 is a schematic view of the image forming apparatus 100 according to the first embodiment. The image forming apparatus 100 is a monochromatic laser beam printer employing an electrophotographic process.

The image forming apparatus 100 includes a feeding portion 1 that feeds a recording material P, an image forming portion 70 serving as an image forming mechanism that forms a toner image on the recording material P fed by the feeding portion 1, and an apparatus body 40 accommodating the feeding portion 1 and the image forming portion 70. The apparatus body 40 is a casing including a frame body and an exterior cover of the image forming apparatus 100.

The feeding portion 1 picks up recording materials P stacked on a support stage in a feeding tray one by one starting from the uppermost one by a feeding roller 3, and the picked-up recording material P is conveyed to a registration roller pair 7 by a conveyance roller pair 5. The registration roller pair 7 corrects the skew of the recording material P, and then conveys the recording material P to a transfer portion of the image forming portion 70.

The image forming portion 70 includes a process cartridge 8, a laser scanner unit 13 serving as an exposing portion, a transfer roller 2 serving as a transfer portion, and a fixing unit 14 serving as a fixing portion. The process cartridge 8 includes a photosensitive drum 9 serving as an image bearing member, a charging roller 10 and a developing roller 11 serving as process portions that act on the photosensitive drum 9, and the like. The photosensitive drum 9 is an electrophotographic photosensitive drum having a cylindrical shape (drum shape).

The process cartridge 8 is an example of a unit attachable to and detachable from the apparatus body 40 of the image forming apparatus 100. In addition, the image forming apparatus 100 includes a front door 18 serving as an opening/closing member openable and closable with respect to the apparatus body 40, and the process cartridge 8 can be attached and detached by opening the front door 18. The attachment/detachment direction of the process cartridge 8 with respect to the apparatus body 40 is a direction intersecting (preferable at a right angle) with the axial direction of the rotation axis of the photosensitive drum 9.

The laser scanner unit 13 is disposed above the process cartridge 8 attached to the apparatus body 40. To be noted, as an exposing portion, for example, a light-emitting diode: LED exposing unit may be used. The fixing unit 14 has a configuration of a thermal fixation system including a fixing roller and a pressurizing roller that nip and convey the recording material P, and a heating portion such as a ceramic heater or a halogen lamp that heats the fixing roller.

Next, an image forming operation of the image forming apparatus 100 will be described. The image forming apparatus 100 executes the image forming operation on the basis of image information received from an external device. When the image forming operation is started, the photosensitive drum 9 is driven in a clockwise direction of FIG. 1 at a predetermined rotational speed (peripheral speed). The predetermined rotational speed is a speed (process speed) corresponding to the length in a sub-scanning direction of an image formed per unit time. The charging roller 10 uniformly charges the surface of the rotating photosensitive drum 9 to a predetermined polarity and potential. The laser scanner unit 13 emits laser light L on the basis of the image information, and exposes the surface of the rotating photosensitive drum 9. As a result of this, an electrostatic latent image corresponding to the image information is drawn on the surface of the photosensitive drum 9. This electrostatic latent image is developed into a toner image with toner serving as developer supplied by the developing roller 11. This toner image is transferred onto the recording material P conveyed in a nip portion between the photosensitive drum 9 and the transfer roller 2 by the transfer roller 2.

The recording material P onto which the toner image has been transferred is conveyed to the fixing unit 14. The fixing unit 14 heats and pressurizes the toner image on the recording material P, and thus the toner image is fixed to the recording material P. Then, the recording material P is discharged to the outside of the apparatus body 40 by a conveyance roller pair 15 and a discharge roller pair 16, and is supported on a discharge tray 17 provided in an upper portion of the apparatus body 40.

In the image forming operation described above, when the rotational speed of the photosensitive drum 9 changes, the irradiation position of the laser light L can be displaced, and the image quality can deteriorate. Specifically, unevenness of image magnification and image density or the like can occur in the sub-scanning direction. Therefore, for the image forming apparatus 100 to output an image of a high image quality, it is desired that the photosensitive drum 9 rotates while maintaining a predetermined rotational speed (i.e., process speed).

Driving Unit of Apparatus Body

Figure 2A:
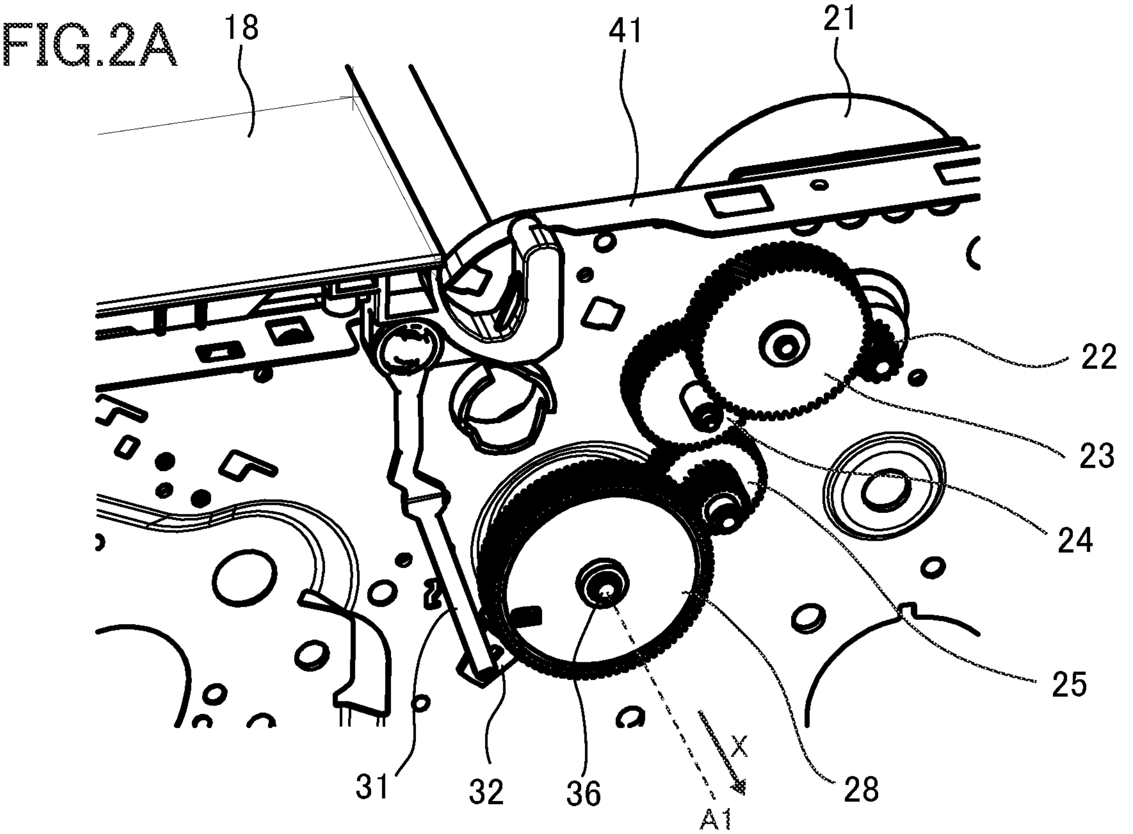
FIG. 2A is a perspective view of part of the image forming apparatus according to the first embodiment.
Figure 2B:
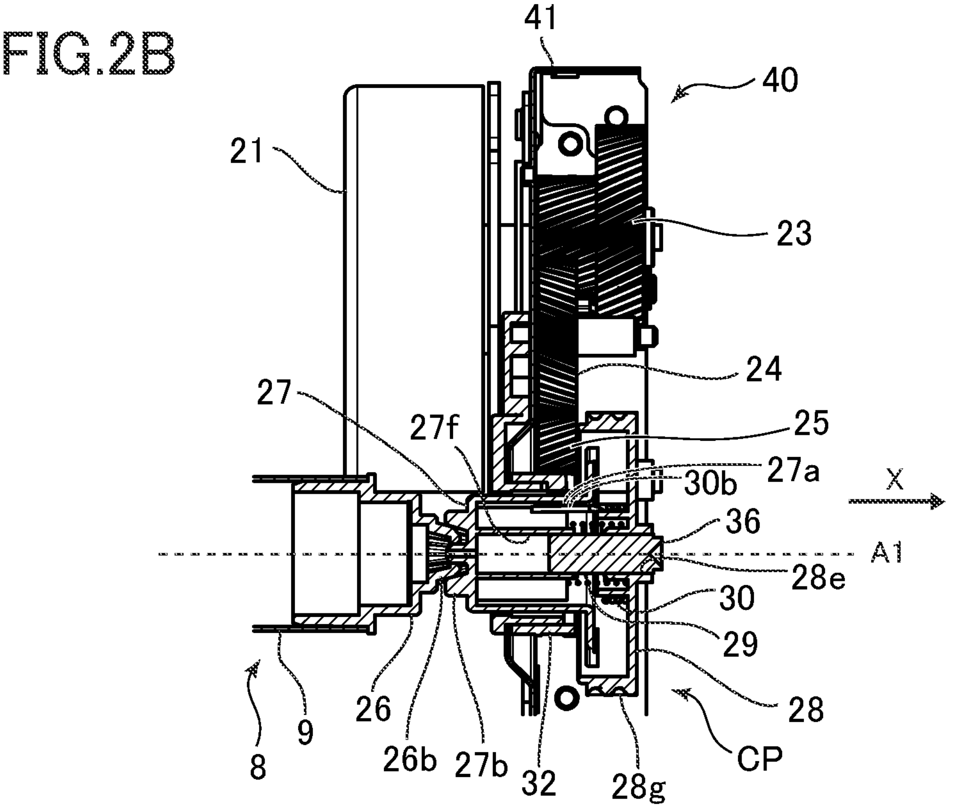
FIG. 2B is a section view of part of the image forming apparatus according to the first embodiment.

FIG. 2A is a perspective view of a driving unit provided in the apparatus body 40. FIG. 2B is a section view of the image forming apparatus 100 taken along a virtual plane passing through a rotation axis A1 that will be described later.

As illustrated in FIGS. 2A and 2B, the apparatus body 40 includes a motor 21, a pinion gear 22, stepped gears 23 and 24, an idler gear 25, a drive gear 28, and a body-side coupling 27. These members are each supported by a side plate 41 serving as a support member. The side plate 41 is a part of the frame body of the apparatus body 40.

The motor 21 consumes electric power to generate a driving force (rotational force). The pinion gear 22 is attached to an output shaft of the motor 21. The stepped gear 23 engages with the pinion gear 22 and the idler gear 25, and the stepped gear 24 engages with the idler gear 25 and the drive gear 28. The rotation of the output shaft of the motor 21 is transmitted to the drive gear 28 via the pinion gear 22, the stepped gear 23, the idler gear 25, and the stepped gear 24. In addition, the angular velocity of the rotation of the output shaft of the motor 21 is reduced to a preset rotational speed (process speed) of the photosensitive drum 9 by the stepped gears 23 and 24.

The motor 21 is a drive source that supplies a driving force for driving the process cartridge 8. In particular, in the present embodiment, the motor 21 supplies a driving force for rotationally driving the photosensitive drum 9. The drive gear 28 is a rotary member (driving member) that is driven by the driving force from the motor 21 to rotate about the rotation axis A1. A gear train constituted by the pinion gear 22, the stepped gears 23 and 24, and the idler gear 25 is an example of a drive transmission portion that transmits a driving force from a drive source to a rotary member.

In the description below, a direction along the rotation axis A1 of the drive gear 28 will be referred to as an "axial direction X". In addition, if necessary, a direction indicated by an arrow in the drawings along the rotation axis A1 will be referred to as a +X direction, and a direction opposite to the arrow will be referred to as a −X direction.

The rotation axis A1 of the drive gear 28 of the present embodiment substantially coincides with the rotation axis of the photosensitive drum 9. In other words, the drive gear 28 is disposed to be coaxial with the photosensitive drum 9. Therefore, the axial direction X can be referred to as an axial direction of the photosensitive drum 9 serving as an image bearing member.

The body-side coupling 27 is movable in the axial direction X of the rotation axis A1 with respect to the drive gear 28 as will be described later, and rotates about the rotation axis A1 together with the drive gear 28. That is, the body-side coupling 27 is an example of a first coupling that rotates about a rotation axis of a rotary member and is movable in the axial direction of the rotation axis with respect to the rotary member.

The process cartridge 8 is provided with a cartridge-side coupling 26 that detachably engages with the body-side coupling 27 and receives the driving force of the motor 21 from the body-side coupling 27. The cartridge-side coupling 26 is provided at an end portion of the photosensitive drum 9 in the axial direction X, and integrally rotates with the photosensitive drum 9 about the rotation axis A1. As a result of the engagement between the body-side coupling 27 and the cartridge-side coupling 26, the driving force of the motor 21 is input to the process cartridge 8, and the photosensitive drum 9 is rotationally driven at a predetermined rotational speed.

The cartridge-side coupling 26 is an example of a second coupling that engages with a first coupling of an apparatus body to receive a driving force. The process cartridge 8 is an example of a unit including the second coupling and attachable to and detachable from the apparatus body. To be noted, although the photosensitive drum 9 will be described as a main driving target in the present embodiment, a driving target (for example, the developing roller 11) other than the photosensitive drum 9 of the process cartridge 8 can be also driven by using the driving force of the motor 21.

Coupling Portion Between Apparatus Body and Process Cartridge

Figure 3A:
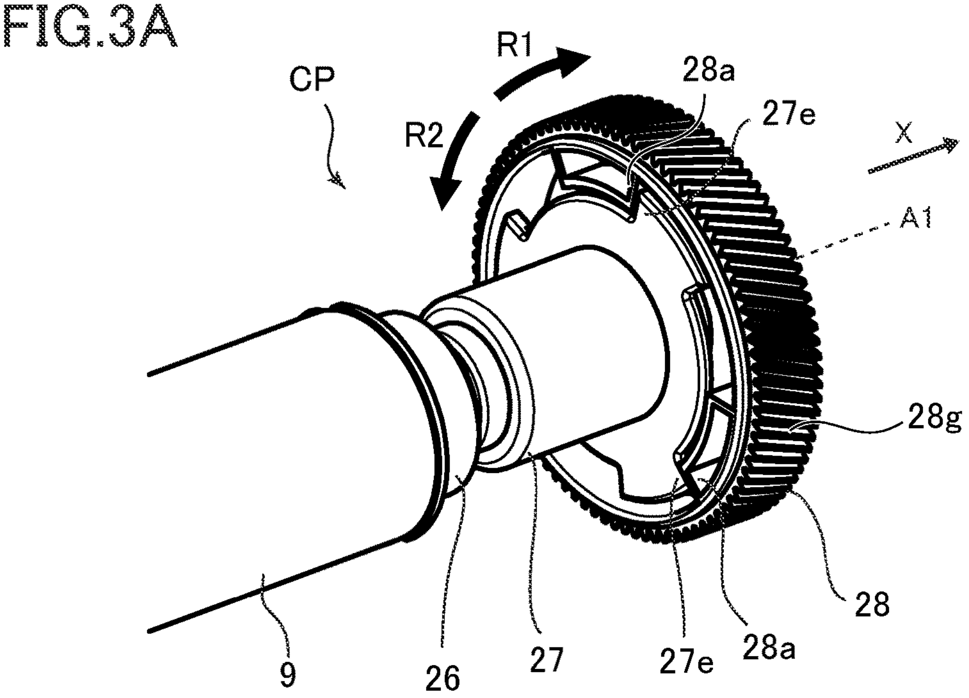
FIGS. 3A and 3B are each an explanatory diagram of an apparatus according to the first embodiment.
Figure 3B:
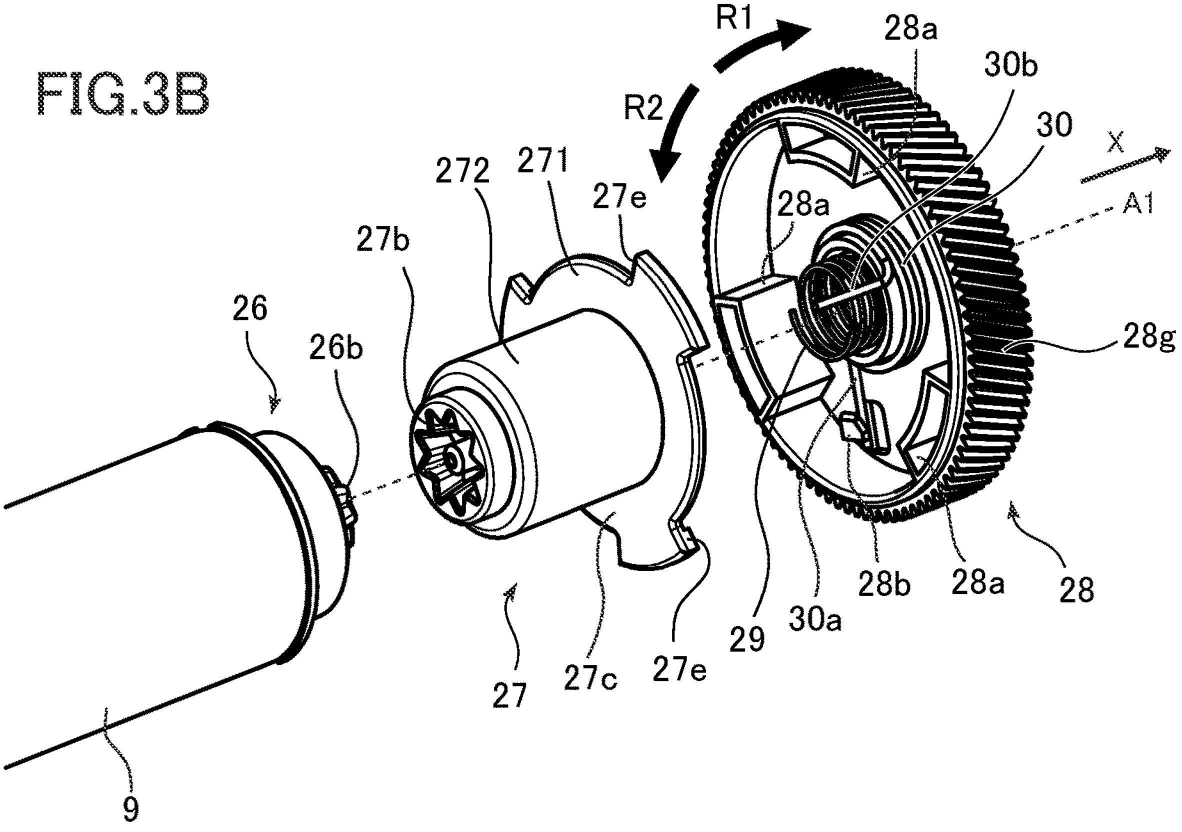

A coupling portion CP serving as a connecting portion that couples the apparatus body 40 and the process cartridge 8 such that drive can be transmitted will be further described with reference to FIGS. 3A and 3B. FIG. 3A is a perspective view of the coupling portion CP and the cartridge-side coupling 26. FIG. 3B is an exploded view of the coupling portion CP.

The coupling portion CP includes the drive gear 28, the body-side coupling 27, a thrust spring 29, a torsion coil spring (helical torsion spring) 30, a support shaft 36 illustrated in FIG. 2B, and the cartridge-side coupling 26. Among these, the drive gear 28, the body-side coupling 27, the thrust spring 29, the torsion coil spring 30, and the support shaft 36 are part of the apparatus body 40. In contrast, the cartridge-side coupling 26 is part of the process cartridge 8. In addition, the drive gear 28, the body-side coupling 27, the thrust spring 29, and the torsion coil spring 30 constitute a rotation unit that integrally rotates.

The drive gear 28 includes a gear portion 28*g* that engages with the stepped gear 24, and drive transmission surfaces 28*a* for transmitting the driving force to the body-side coupling 27. The drive transmission surfaces 28*a* are formed on the inner peripheral side of the gear portion 28*g* in the rotation radius direction of the drive gear 28. The drive gear 28 is rotationally driven in a predetermined first rotation direction about the rotation axis A1 by the driving force transmitted thereto from the motor 21 via the stepped gear 24 and the like. The first rotation direction will be hereinafter referred to as a driving direction R1.

The body-side coupling 27 includes force receiving surfaces 27*e* that receive the driving force from the drive transmission surfaces 28*a*, and an engaging portion 27*b* that engages with the cartridge-side coupling 26. The body-side coupling 27 rotates about the rotation axis A1. That is, the body-side coupling 27 is provided to be coaxial with the drive gear 28.

The drive transmission surfaces 28*a* of the drive gear 28 are each an abutting portion that abuts the body-side coupling 27. The force receiving surfaces 27*e* of the body-side coupling 27 are each an abutted portion that one of the drive transmission surfaces 28*a* of the drive gear 28 abuts. In the case where the drive gear 28 rotates in the driving direction R1, the force receiving surfaces 27*e* are pressed by the drive transmission surfaces 28*a*, and thus the body-side coupling 27 rotates in the driving direction R1 together with the drive gear 28.

The drive transmission surfaces 28*a* and the force receiving surfaces 27*e* can be disposed at a plurality of positions around the rotation axis A1. In the present embodiment, the drive transmission surfaces 28*a* are provided at three positions around the rotation axis A1 at equal intervals in the rotation direction, and the force receiving surfaces 27*e* are provided at three positions around the rotation axis A1 at equal intervals in the rotation direction.

In addition, the shape of the body-side coupling 27 includes a cylindrical portion 272 having a cylindrical shape and extending in the axial direction X and a flange portion 271 extending outward in the rotation radius direction of the body-side coupling 27 from one end portion of the cylindrical portion 272. The force receiving surfaces 27*e* are provided on the flange portion 271, and the engaging portion 27*b* is provided at a distal end portion of the cylindrical portion 272 opposite to the flange portion 271.

The support shaft 36 illustrated in FIG. 2B supports the drive gear 28 and the body-side coupling 27. The support shaft 36 is a shaft member (columnar member) extending in the axial direction X. The center line of the support shaft 36 substantially coincides with the rotation axis A1. The support shaft 36 is inserted through the hole portion 28*e* of the drive gear 28 serving as a first hole portion in the axial direction X and is inserted in the hole portion 27*f* of the body-side coupling 27 serving as a second hole portion from the +X side. The body-side coupling 27 is rotatably supported at the hole portion 27*f* by the support shaft 36, and is relatively movable in the axial direction X with respect to the support shaft 36. Meanwhile, for example, the drive gear 28 can be formed as a member integrated with the support shaft 36 by press-fitting the support shaft 36 into the hole portion 28*e*.

To be noted, the hole portion 28*e* of the drive gear 28 is a cylindrical portion provided more on the inner peripheral side than the gear portion 28*g* and the drive transmission surfaces 28*a* in the rotation radius direction of the drive gear 28. The hole portion 27*f* of the body-side coupling 27 is a hole shape provided on the inner peripheral side of the cylindrical portion 272 in the rotation radius direction of the body-side coupling 27.

The cartridge-side coupling 26 includes an engaged portion 26*b* that is to be engaged with the engaging portion 27*b* of the body-side coupling 27. The engaging portion 27*b* has such a shape that the engaging portion 27*b* can transmit the rotation about the rotation axis A1 to the cartridge-side coupling 26 by engaging with the engaged portion 26*b*. The engaging portion 27*b* of the present embodiment has a recess shape that is a polygonal shape (star shape) as viewed in the axial direction X and recessed to one side (+X side) in the axial direction X, and the engaged portion 26*b* has a projecting shape corresponding to the recess portion. To be noted, the shapes of the engaging portion 27*b* and the engaged portion 26*b* are not limited to these.

Figure 4A:
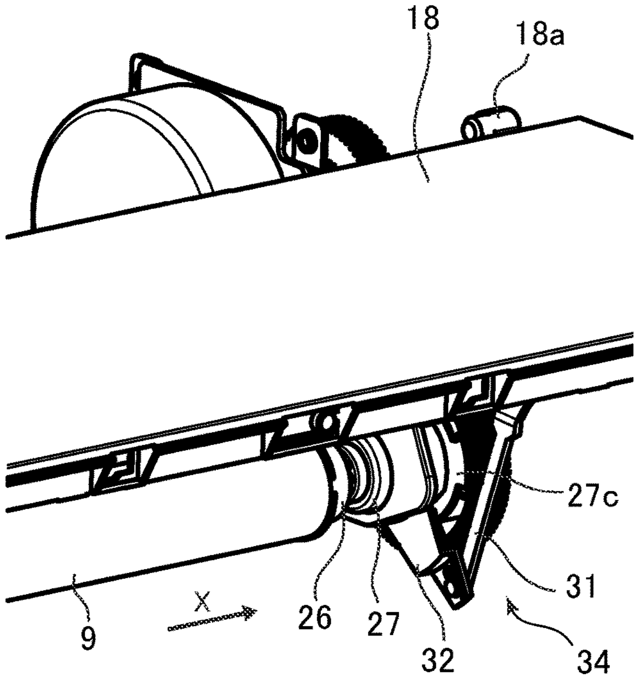
FIGS. 4A to 4D are each an explanatory diagram of the apparatus according to the first embodiment.
Figure 4B:
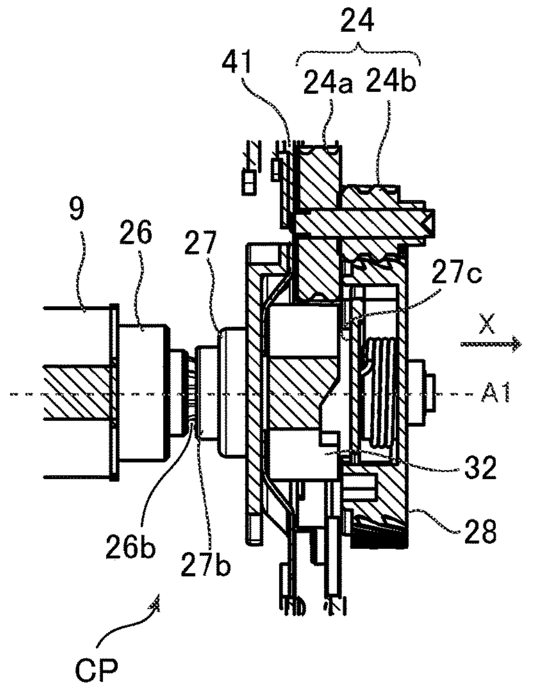
Figure 4C:
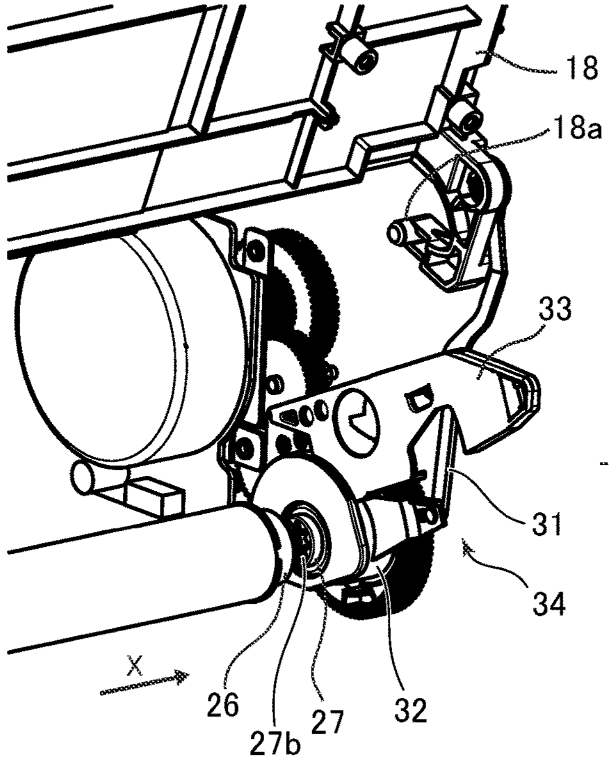
Figure 4D:
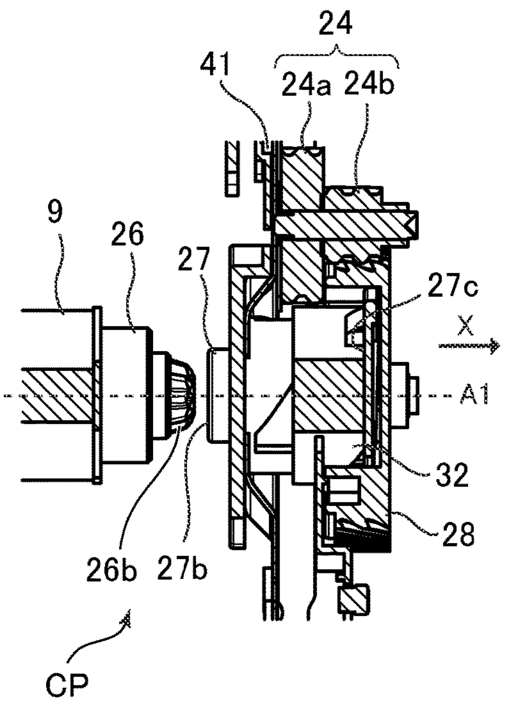

The body-side coupling 27 is movable between an engaging position illustrated in FIGS. 4A and 4B where the engaging portion 27*b* engages with the engaged portion 26*b* of the cartridge-side coupling 26 and a disengaging position illustrated in FIGS. 4C and 4D where the engaging portion 27*b* disengages from the engaged portion 26*b* in the axial direction X. The engaging position (drive transmission position) of the body-side coupling 27 is a position where drive transmission from the motor 21 to the photosensitive drum 9 is possible. The disengaging position (release position) of the body-side coupling 27 is a position where the drive is not transmitted from the motor 21 to the photosensitive drum 9.

To be noted, the body-side coupling 27 is configured to move in the axial direction X with respect to the drive gear 28 while maintaining the engagement with the drive gear 28. In other words, even in the case where the body-side coupling 27 is located at any position between the engaging position and the disengaging position, at least part of the force receiving surfaces 27*e* are in contact with the drive transmission surfaces 28*a*. Therefore, even in the case where the body-side coupling 27 has moved from the engaging position to the disengaging position and disengaged from the cartridge-side coupling 26, the body-side coupling 27 is not separated from the drive gear 28, and thus a state in which the body-side coupling 27 integrally rotates with the drive gear 28 is maintained.

The thrust spring 29 is an example of an urging member serving as a second urging member that urges the body-side coupling 27 in the axial direction X. As illustrated in FIGS. 2B and 3B, the thrust spring 29 is disposed in such an orientation that the axial direction of the coil is approximately parallel to the axial direction X of the photosensitive drum 9. A “thrust spring” is a spring that generates an axial force along a thrust direction, that is, the axial direction of the coil. The thrust spring 29 of the present embodiment is a compression spring provided between the drive gear 28 and the body-side coupling 27 in a compressed state. The thrust spring 29 has one end surface in the axial direction X abutting the drive gear 28, and another end surface in the axial direction X abutting the body-side coupling 27. The thrust spring 29 urges the body-side coupling 27 toward the cartridge-side coupling 26 in the axial direction X, that is, in the −X direction.

To be noted, the drive gear 28 is configured not to move in the axial direction X even in the case of receiving an urging force in the +X direction from the thrust spring 29. For example, a gear box cover fixed to the side plate 41 illustrated in FIG. 2A abuts the drive gear 28 from one side (+X side) in the axial direction X such that the movement of the drive gear 28 in the +X direction is restricted. In addition, part of the side plate 41 or the large-diameter gear portion 24*a* of the stepped gear 24 illustrated in FIG. 4B abuts a side surface of the drive gear 28 on the other side (−X side) in the axial direction X such that the movement of the drive gear 28 in the −X direction is restricted.

The engaging portion 27*b* and the engaged portion 26*b* are pressed against each other in the axial direction X by the urging force of the thrust spring 29, and thus the relative positions of the body-side coupling 27 and the cartridge-side coupling 26 in the rotation direction are determined, that is, the gap is reduced. Here, the relative positions of the body-side coupling 27 and the cartridge-side coupling 26 in the rotation direction being determined, that is, the gap being reduced indicates that not only relative rotation between the two is restricted such that the drive can be transmitted, but also minute relative rotation resulting from the play between the engaging portion 27*b* and the engaged portion 26*b* is substantially prevented or suppressed.

Specifically, as illustrated in FIG. 3B, the engaging portion 27*b* is formed as a recess portion having a wavy shape having ridge lines radially extending from the rotation axis A1 as viewed in the axial direction X and inclined surfaces extending on both sides in the rotation direction about the rotation axis A1 from the respective ridge lines. The engaged portion 26*b* is also formed as a projecting portion having a wavy shape corresponding to the wavy shape of the engaging portion 27*b*.

According to this configuration, in the case where the engaging portion 27*b* is pressed against the engaged portion 26*b* in a state in which the ridge lines are displaced from each other, the inclined surfaces of the body-side coupling 27 and the inclined surfaces of the cartridge-side coupling 26 abut each other on one side of the ridge lines. Therefore, a rotational force that causes the respective ridge lines to match as viewed in the axial direction X is generated between the body-side coupling 27 and the cartridge-side coupling 26. In this manner, in the case where the engaging portion 27*b* and the engaged portion 26*b* are pressed against each other in the axial direction X by the urging force of the thrust spring 29, the relative positions of the body-side coupling 27 and the cartridge-side coupling 26 in the rotational direction are determined such that the respective ridge lines match each other as viewed in the axial direction X.

To be noted, the recess portion and projecting portion of the engaging portion 27*b* and the engaged portion 26*b* are interchangeable. In addition, the shapes of the engaging portion 27*b* and the engaged portion 26*b* described above are merely examples, and for example, a configuration in which the engaging portion 27*b* is formed in a cylindrical shape having a spline shape on the inner peripheral portion thereof and the engaged portion 26*b* is formed in a columnar shape having a spline shape on the outer peripheral portion thereof may be employed. In this case, by forming the spline shapes having teeth formed in tapered shapes such that both side surfaces of each tooth of the spline shapes comes into contact with a tooth of the other when the engagement between the engaging portion 27*b* and the engaged portion 26*b* is deep, the relative positions of the couplings in the rotation direction can be determined by the urging force of the thrust spring 29.

The torsion coil spring 30 is an example of an urging member (a first urging member) that urges the body-side coupling 27 in the rotation direction about the rotation axis A1. The torsion coil spring 30 includes a helical coil portion and arm portions 30*a* and 30*b* respectively protruding from two ends of the coil portion. One arm portion 30*a* is attached to a spring reception portion 28*b* provided on the drive gear 28 illustrated in FIG. 3B, and the other arm portion 30*b* is attached to a spring reception portion 27*a* provided on the body-side coupling 27 illustrated in FIG. 2B.

An urging direction R2 of the body-side coupling 27 by the torsion coil spring 30 serving as a second rotation direction is a rotation direction opposite to the first direction in which the drive gear 28 is driven by the driving force from the motor 21, that is, the driving direction R1 illustrated in FIG. 3A.

Movement of Body-Side Coupling

In the case of attaching or detaching the process cartridge 8 to or from the apparatus body 40, it is desirable that the body-side coupling 27 is separate from the cartridge-side coupling 26. Therefore, in the present embodiment, as illustrated in FIG. 2A, an interconnecting mechanism 34 that moves the body-side coupling 27 in an interconnected manner with the opening/closing of the front door 18 is provided in the apparatus body 40.

FIG. 4A is a perspective view of the interconnecting mechanism 34 and the coupling portion CP in a state in which the front door 18 is closed. FIG. 4B is a section view of the coupling portion CP in the state in which the front door 18 is closed. FIG. 4C is a perspective view of the interconnecting mechanism 34 and the coupling portion CP in a state in which the front door 18 is open. FIG. 4D is a section view of the coupling portion CP in the state in which the front door 18 is open.

As illustrated in FIGS. 4A and 4C, the front door 18 has a rotatable support portion 18*a* rotatably supported by the apparatus body 40, and is capable of pivoting (openable and closable) about the rotatable support portion 18*a*. The front door 18 is movable between a closed position where the front door 18 closes an opening 401 of the apparatus body 40 illustrated in FIGS. 1 and 4A, and an open position where the front door 18 exposes the opening 401 illustrated in FIG. 1 so as to allow attachment and detachment of the process cartridge 8 as illustrated in FIG. 4C. In a state in which the front door 18 is at the closed position, the image forming apparatus 100 can execute the image forming operation. The user can attach and detach the process cartridge 8 through the opening 401 by moving the front door 108 from the closed position to the open position.

As illustrated in FIGS. 2A, 4A, and 4C, the interconnecting mechanism 34 includes a link 31, a rotary cam 32, and a guide member 33.

The link 31 is a member having one end coupled to the front door 18 and another end coupled to the rotary cam 32. The link 31 slides in a direction intersecting with the axial direction X, which is an approximate vertical direction in the present embodiment, in an interconnected manner with the opening and closing of the front door 18.

The rotary cam 32 is pivotably (rotatably) supported by the side plate 41 of the apparatus body 40 illustrated in FIG. 2A. The rotary cam 32 is coupled to the front door 18 via the link 31 such that the rotational angle thereof changes in an interconnected manner with the opening and closing of the front door 18. The rotary cam 32 is disposed on the outer peripheral side of the cylindrical portion 272 of the body-side coupling 27 illustrated in FIG. 2B, and is relatively rotatable about the rotation axis A1 with respect to the body-side coupling 27. In addition, the rotary cam 32 is movable in the axial direction and is relatively movable in the axial direction X with respect to the body-side coupling 27.

The body-side coupling 27 has a pressed portion 27*c* illustrated in FIG. 3B that the rotary cam 32 abuts.

The guide member 33 illustrated in FIG. 4C is a fixed member fixed to the apparatus body 40. The guide member 33 has a cam surface that abuts the rotary cam 32 to move the rotary cam 32 in the axial direction X in accordance with the rotational angle of the rotary cam 32. To be noted, the guide member 33 of the present embodiment also serves as a guide that regulates (guides) the attachment/detachment direction of the process cartridge 8 with respect to the apparatus body 40.

As illustrated in FIGS. 4A and 4B, in the case where the front door 18 is positioned in the closed position, the body-side coupling 27 is held at the engaging position by the urging force in the −X direction of the thrust spring 29 illustrated in FIGS. 2B and 3B.

As illustrated in FIGS. 4C and 4D, when the front door 18 is moved from the closed position to the open position, the rotary cam 32 rotates in a counterclockwise direction in FIG. 4C in an interconnected manner with the front door 18, and the rotary cam 32 moves in the +X direction by the action of the cam surface of the guide member 33. Then, the rotary cam 32 presses the pressed portion 27*c* of the body-side coupling 27 in the +X direction, and the body-side coupling 27 moves in the +X direction against the urging force of the thrust spring 29. As a result of this, while the front door 18 moves from the closed position to the open position, the body-side coupling 27 moves (retracts) from the engaging position to the disengaging position.

In contrast, in the case of closing the front door 18, the body-side coupling 27 moves in the −X direction in a process reversed from the process described above. That is, when the front door 18 is moved from the open position to the closed position, the rotary cam 32 rotates in the clockwise direction in FIG. 4C in an interconnected manner with the front door 18. Then, the rotary cam 32 is released from the pressurization by the cam surface of the guide member 33, and therefore the rotary cam 32 and the body-side coupling 27 move in the −X direction in accordance with the urging force of the thrust spring 29. As a result of this, the body-side coupling 27 moves from the disengaging position to the engaging position while the front door 18 moves from the open position to the closed position.

In this manner, the interconnecting mechanism 34 disengages the body-side coupling 27 from the cartridge-side coupling 26 in an interconnected manner with the opening of the front door 18. As a result of this, occurrence of interference between the cartridge-side coupling 26 and the body-side coupling 27 can be avoided when attaching or detaching the process cartridge 8 in a state in which the front door 18 is open. In addition, since the body-side coupling 27 engages with the cartridge-side coupling 26 in an interconnected manner with the operation of closing the front door 18 after the process cartridge 8 is attached, a state in which the photosensitive drum 9 of the process cartridge 8 can be driven to execute the image forming operation can be obtained.

To be noted, as illustrated in FIG. 4D, the disengaging position of the body-side coupling 27 is preferably such a position that a clearance in the axial direction X is secured between the body-side coupling 27 and the cartridge-side coupling 26 as viewed in a direction orthogonal to the axial direction X. As a result of this, in the case of attaching or detaching the process cartridge 8 to or from the apparatus body 40 in the direction orthogonal to the axial direction X, the interference between the body-side coupling 27 and the cartridge-side coupling 26 can be more reliably avoided.

Here, in the present embodiment, since the body-side coupling 27 is provided as a member separate from the drive gear 28, movement of the drive gear 28 in the axial direction X can be suppressed even in the case where the body-side coupling 27 moves in the axial direction X. As a result of this, as compared with a configuration in which the body-side coupling 27 and the drive gear 28 integrally move in the axial direction X, since a space where the drive gear 28 moves does not need to be secured, the size of the space for the coupling portion CP can be reduced, which contributes to miniaturization of the image forming apparatus.

As a specific example of reduction of required space, in the present embodiment, the large-diameter gear portion 24*a* of the stepped gear 24 can be provided between the drive gear 28 and the side plate 41 as illustrated in FIG. 4D. The large-diameter gear portion 24*a* is a gear portion of the stepped gear 24 having a larger outer diameter than the small-diameter gear portion 24*b* in the stepped gear 24 that engages with the drive gear 28. That is, in a configuration in which the body-side coupling 27 and the drive gear 28 integrally move in the axial direction X, there is a possibility that the drive gear 28 interferes with the large-diameter gear portion 24*a* in the case where the body-side coupling 27 moves from the disengaging position illustrated in FIG. 4D to the engaging position illustrated in FIG. 4B. If the interval between the drive gear 28 and the side plate 41 is increased to avoid such interference, the space required for providing the coupling portion CP becomes larger, which leads to increase in the size of the image forming apparatus.

In contrast, according to the present embodiment, since the drive gear 28 is configured not to move in the axial direction X the large-diameter gear portion 24*a* can be provided while reducing the interval between the drive gear 28 and the side plate 41. That is, according to the present embodiment, the space required for providing the coupling portion CP can be reduced in size, and thus the image forming apparatus can be miniaturized.

Functions of Thrust Spring and Torsion Coil Spring

Next, functions of the thrust spring 29 and the torsion coil spring 30 in drive transmission from the apparatus body 40 to the process cartridge 8 will be described.

As described above, the body-side coupling 27 of the present embodiment is a member separate from the drive gear 28 that rotates by the driving force from the drive source, and is relatively movable in the axial direction X with respect to the drive gear 28. In this configuration, it is preferable that there is a gap (play, clearance) in the rotation direction between the body-side coupling 27 and the drive gear 28. On the other hand, the gap in the rotation direction can cause minute relative rotation between the drive gear 28 and the body-side coupling 27. In a state in which the body-side coupling 27 is driven by the drive gear 28, the body-side coupling 27 cannot relatively move in a direction opposite to the driving direction R1 with respect to the drive gear 28, but can relatively move in the driving direction R1 by an amount corresponding to the gap.

For example, there is a case where the force that the photosensitive drum 9 receives changes, and apparently a torque in the driving direction R1 acts on the photosensitive drum 9. In this case, in the present embodiment, since relative movement of the body-side coupling 27 in the rotation direction with respect to the cartridge-side coupling 26 is restricted, the photosensitive drum 9, the cartridge-side coupling 26, and the body-side coupling 27 rotate integrally. In a state in which the body-side coupling 27 can relatively move in the driving direction R1 with respect to the drive gear 28, in the case where the force that the photosensitive drum 9 receives changes, there is a possibility that the rotational speed of the photosensitive drum 9, the cartridge-side coupling 26, and the body-side coupling 27 increases. That is, as a result of the body-side coupling 27 relatively rotating with respect to the drive gear 28, there is a possibility that the rotational speed of the photosensitive drum 9 changes even in the case where the drive gear 28 rotates at a constant angular velocity.

Here, in the present embodiment, the torsion coil spring 30 is disposed between the drive gear 28 and the body-side coupling 27, and the body-side coupling 27 is urged in an urging direction R2 illustrated in FIGS. 3A and 3B by the urging force of the torsion coil spring 30. The urging direction R2 is a rotation direction opposite to the driving direction R1, in which the drive gear 28 rotates while pressing the force receiving surfaces 27*e* of the body-side coupling 27 by the drive transmission surfaces 28*a*.

Therefore, for example, even in the case where the body-side coupling 27 receives a torque in a direction in which the force receiving surfaces 27*e* move away from the drive transmission surfaces 28*a* with respect to the drive gear 28, that is, the driving direction R1, a state in which the force receiving surfaces 27*e* are in contact with the drive transmission surfaces 28*a* is maintained. Therefore, the body-side coupling 27 can integrally rotate with the drive gear 28 while the force receiving surfaces 27*e* are in contact with the drive transmission surfaces 28*a*. Therefore, increase in the rotational speed of the photosensitive drum 9, the cartridge-side coupling 26, and the body-side coupling 27 can be suppressed.

That is, the present embodiment includes a first urging member (torsion coil spring 30) that urges a first coupling (body-side coupling 27) in a second rotation direction (urging direction R2) opposite to a first rotation direction (driving direction R1). Since the contact between an abutted portion (force receiving surface 27*e*) of the first coupling and an abutting portion (drive transmission surface 28*a*) of a rotary member (drive gear 28) is maintained by the urging force of the first urging member, the relative positions of the rotary member and the first coupling in the rotational direction are determined. In other words, the gap between the rotary member and the first coupling in the rotational direction is reduced. Therefore, the stability of the angular velocity of the first coupling is improved, the rotation of the rotary member can be more precisely transmitted to the second coupling on the unit side, and thus more stable drive transmission can be performed between the apparatus body and the unit.

Particularly, in the present embodiment, variation in the rotational speed of the image bearing member (photosensitive drum 9) that is a driving target on the unit side can be reduced. As described above, the variation in the rotational speed of the photosensitive drum 9 can lead to deterioration of the image quality in the image forming apparatus. Therefore, according to the present embodiment, the image quality can be improved by reducing the variation in the rotational speed of the photosensitive drum 9.

The variation in the rotational speed of the photosensitive drum 9 is likely to occur in the case where the rotational torque of the photosensitive drum 9, that is, torque required for rotating the photosensitive drum 9 is small. In the present embodiment, toner on the surface of the photosensitive drum 9 is collected by the developing roller 11, and is reused for image formation on the recording material P. In the configuration in which the toner on the surface of the photosensitive drum 9 is collected by the developing roller 11, the rotational torque of the photosensitive drum 9 is smaller than in a configuration in which a cleaning blade abuts the surface of the photosensitive drum 9. However, variation in the rotational speed of the photosensitive drum 9 can be reduced by urging the body-side coupling 27 in the urging direction R2.

In addition, in the present embodiment, by providing the thrust spring 29 serving as a second urging member, the body-side coupling 27 is urged in the axial direction X and pressed against the cartridge-side coupling 26. As a result of this, the engagement between the body-side coupling 27 and the cartridge-side coupling 26 is maintained, and more stable drive transmission can be performed between the apparatus body and the unit.

Particularly, the engaging portion 27*b* of the body-side coupling 27 and the engaged portion 26*b* of the cartridge-side coupling 26 are configured such that the gap between the body-side coupling 27 and the cartridge-side coupling 26 in the rotation direction is reduced by pressing the engaging portion 27*b* and the engaged portion 26*b* against each other in the axial direction X. As a result of this, further stable drive transmission can be performed between the apparatus body and the unit.

Second Embodiment

An image forming apparatus according to a second embodiment will be described. In the description below, it is assumed that elements denoted by the same reference signs as in the first embodiment have substantially the same configurations and functions as those described in the first embodiment, and parts different from the first embodiment will be mainly described.

Figure 5:
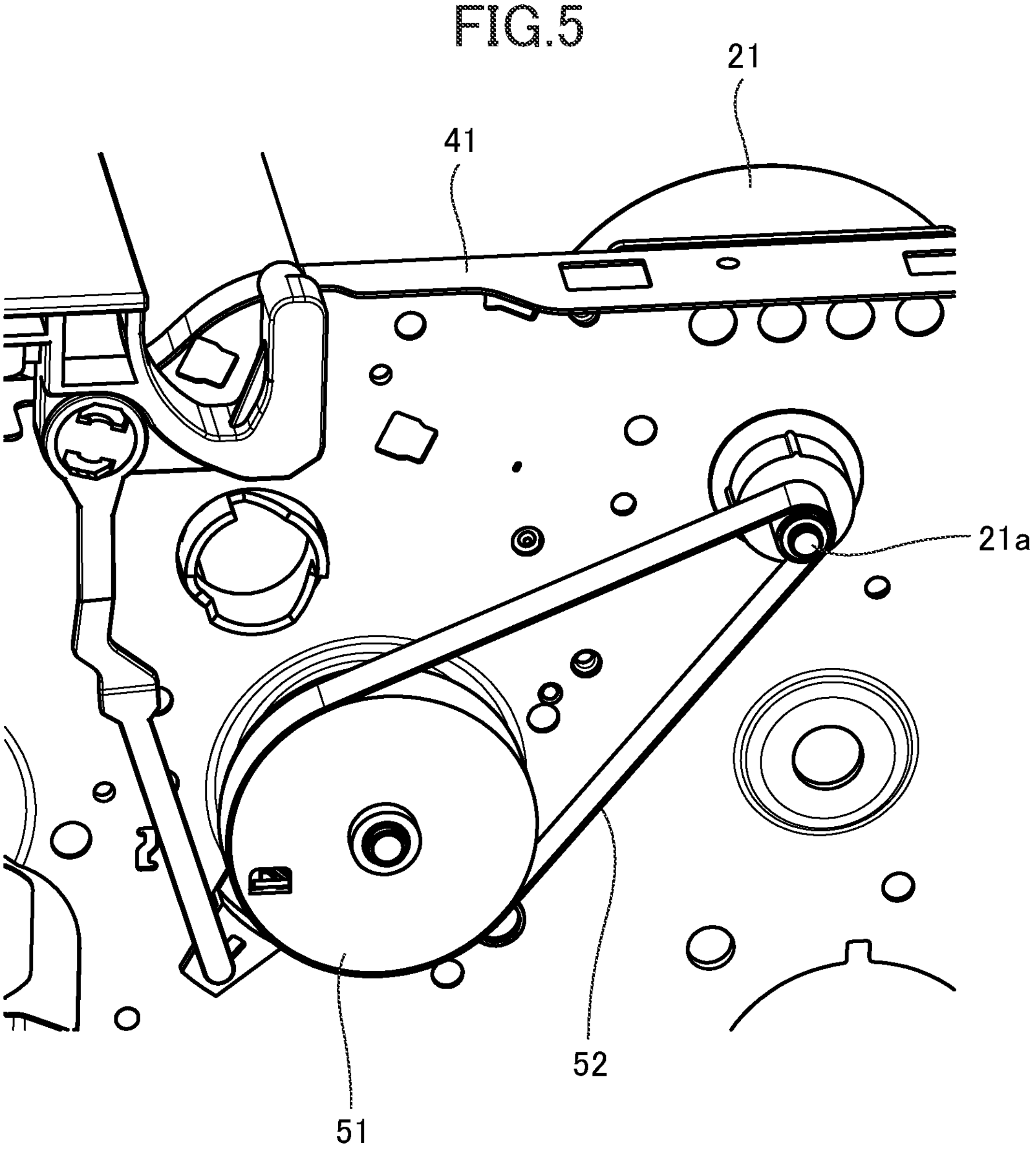
FIG. 5 is an explanatory diagram of an apparatus according to a second embodiment.

FIG. 5 is a perspective view of a drive transmission portion that transmits a driving force from a drive source to a rotary member in an image forming apparatus according to the second embodiment. In the present embodiment, the configuration of the drive transmission portion from the drive source (motor) to the rotary member is different from the first embodiment. That is, the motor 21 serving as a drive source and a drive pulley 51 serving as a rotary member are coupled via an endless belt 52. The belt 52 is stretched over an output pulley provided on the output shaft 21*a* of the motor 21 and the drive pulley 51.

Also in the present embodiment, the body-side coupling 27 serving as a first coupling is urged in an urging direction serving as a second rotation direction opposite to a driving direction of the drive pulley 51 serving as a first rotation direction. As a first urging member, a torsion coil spring having one arm portion attached to a spring reception portion provided on the drive pulley 51 and another arm portion attached to a spring reception portion provided on the body-side coupling 27 can be used. In addition, the body-side coupling 27 is urged toward the cartridge-side coupling 26 in the axial direction X by the thrust spring 29 serving as a second urging member.

According to the present embodiment, more stable drive transmission can be performed between the apparatus body and the unit similarly to the first embodiment.

In addition, in the present embodiment, since the motor 21 and the drive pulley 51 are coupled via the belt 52, gap resulting from backlash between gears can be reduced as compared with a configuration in which the motor 21 and the drive gear 28 are coupled via a gear train. By reducing the gap in a drive transmission path from the motor 21 to the photosensitive drum 9 to an extremely low level, the effective moment of inertia of the photosensitive drum 9 is increased, the rotational speed of the photosensitive drum 9 can be more stable, and the image quality can be further improved.

To be noted, the gear train of the first embodiment and the belt mechanism of the second embodiment are each an example of a transmission mechanism that transmits a driving force from a drive source to a rotary member, and a different transmission mechanism may be used.

Third Embodiment

An image forming apparatus according to a third embodiment will be described. In the description below, it is assumed that elements denoted by the same reference signs as in the first embodiment have substantially the same configurations and functions as those described in the first embodiment, and parts different from the first embodiment will be mainly described.

Figure 6:
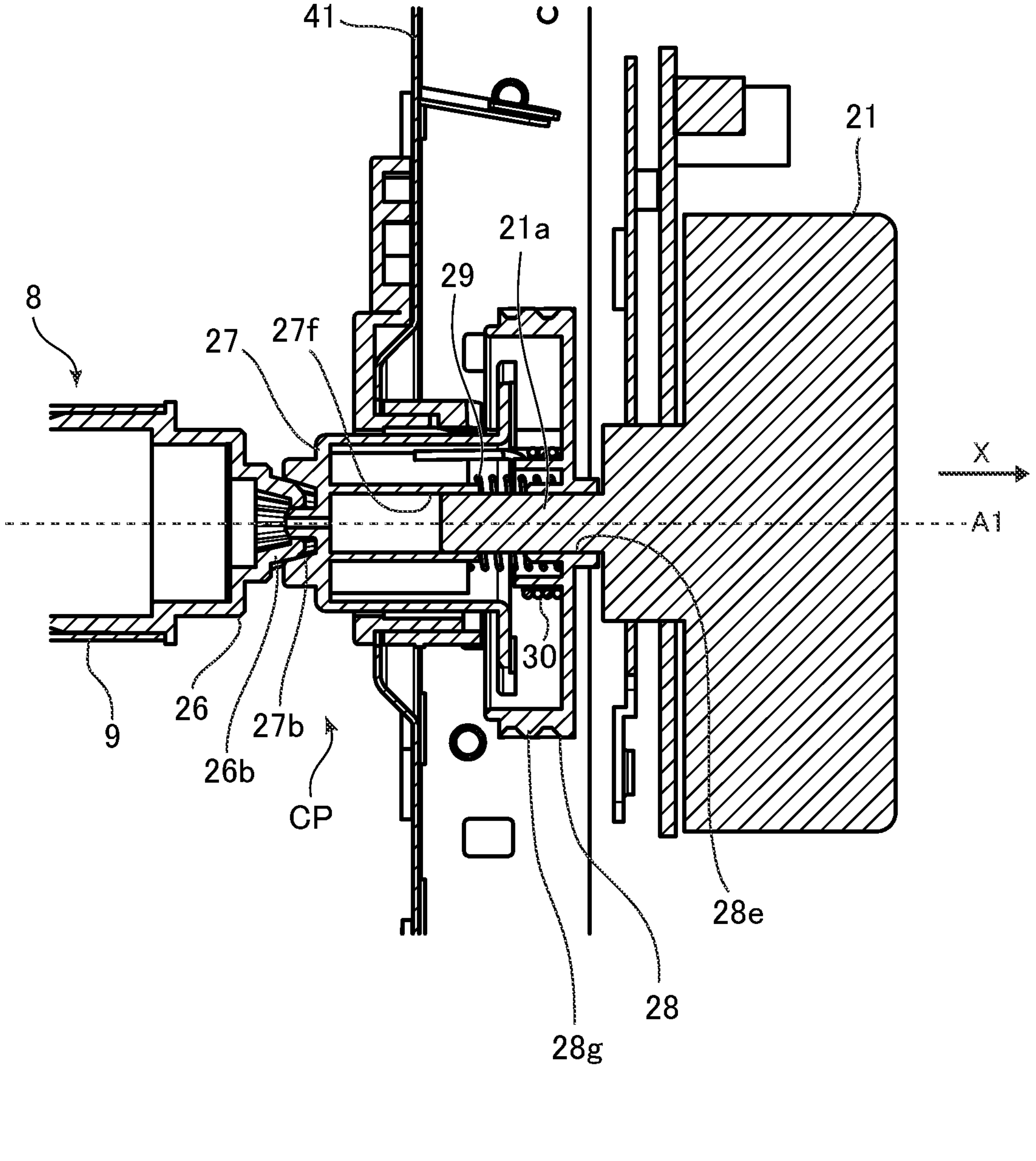
FIG. 6 is an explanatory diagram of an apparatus according to a third embodiment.

The present embodiment is different from the first embodiment in the positional relationship between the drive source and the rotary member. As illustrated in FIG. 6, the motor 21 serving as a drive source of the present embodiment is disposed to be coaxial with the photosensitive drum 9, the drive gear 28, the body-side coupling 27, and the cartridge-side coupling 26. That is, the output shaft 21*a* of the motor 21 rotates about the rotation axis A1.

The drive gear 28 as the rotary member is fixed to the output shaft 21*a*, and integrally rotates with the output shaft 21*a*. To be noted, the output shaft 21*a* is inserted in the hole portion 28*e* of the drive gear 28 and the hole portion 27*f* of the body-side coupling 27, and also serves as a shaft member that supports the drive gear 28 and the body-side coupling 27. In addition, the driving force of the motor 21 can be transmitted to a driving target other than the photosensitive drum 9 via the gear portion 28*g* of the drive gear 28.

Also in the present embodiment, the body-side coupling 27 serving as a first coupling is urged in a predetermined second rotation direction, which is the same as the urging direction R2 of FIGS. 3A and 3B, by a first urging member. The second rotation direction is a rotation direction opposite to the first rotation direction, which is the same as the driving direction R1 of FIGS. 3A and 3B and in which the drive gear 28 rotates together with the output shaft 21*a* of the motor 21. As the first urging member, a torsion coil spring 30 similar to that of the first embodiment can be used. In addition, the body-side coupling 27 is urged toward the cartridge-side coupling 26 in the axial direction X by the thrust spring 29 serving as a second urging member.

According to the present embodiment, similarly to the first embodiment, more stable drive transmission can be performed between the apparatus body and the unit.

In addition, in the present embodiment, since the output shaft 21*a* of the motor 21 and the drive gear 28 are directly connected (fixed), variation in the angular velocity of the drive gear 28 resulting from the gap in the transmission mechanism can be reduced as compared with a configuration in which the motor 21 and the drive gear 28 are coupled via a transmission mechanism such as a gear train. Therefore, the effective moment of inertia of the photosensitive drum 9 increases, thus the rotational speed of the photosensitive drum 9 is further stabilized, and the image quality can be further improved.

Fourth Embodiment

An image forming apparatus according to a fourth embodiment will be described. In the description below, it is assumed that elements denoted by the same reference signs as in the first embodiment have substantially the same configurations and functions as those described in the first embodiment, and parts different from the first embodiment will be mainly described.

Figure 7:
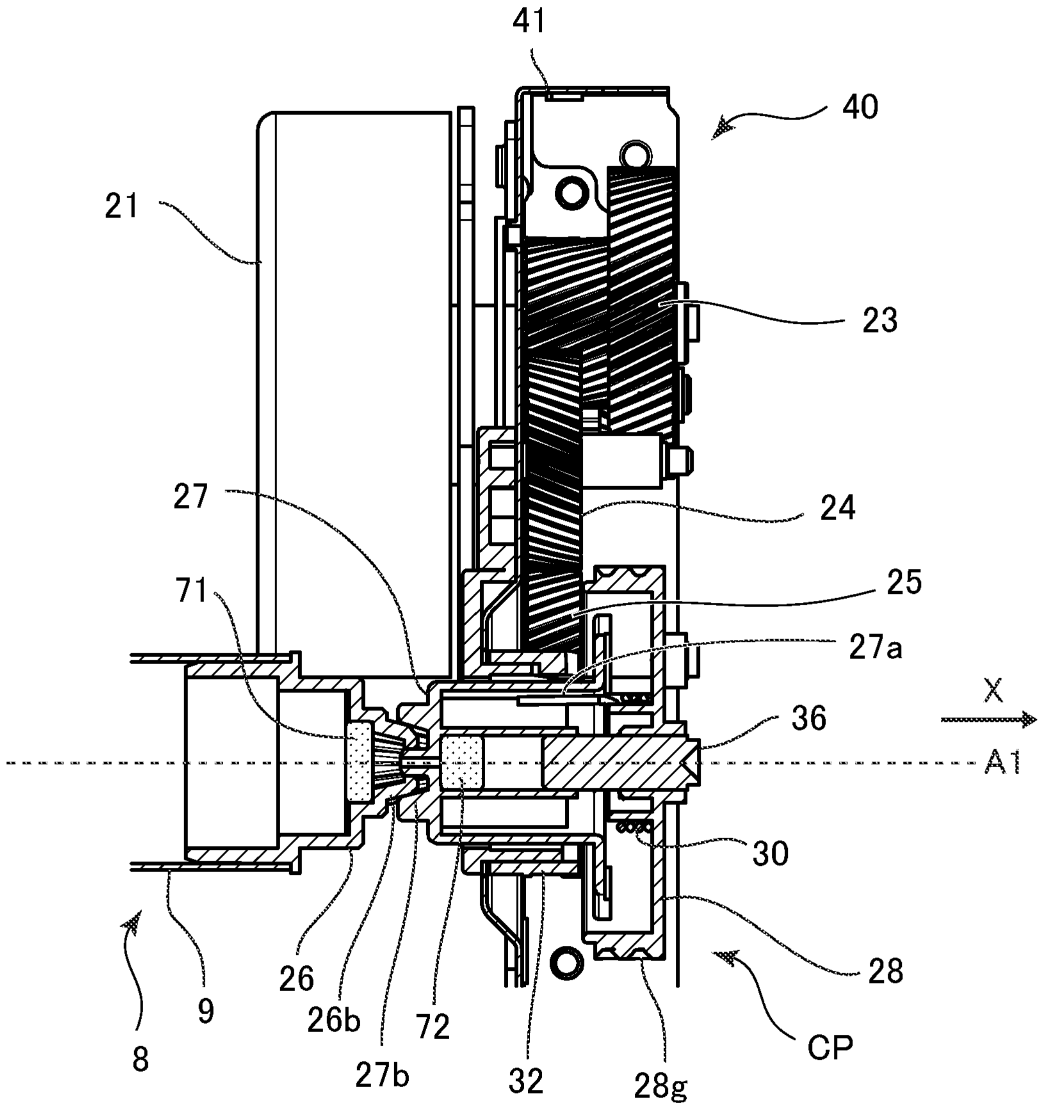
FIG. 7 is an explanatory diagram of an apparatus according to a fourth embodiment.

The present embodiment is different from the first embodiment in that a magnet is used as the second urging member. FIG. 7 is a section view of the coupling portion CP according to the present embodiment. Similarly to the first embodiment, the body-side coupling 27 is urged in a predetermined rotation direction (urging direction R2) by the torsion coil spring 30 serving as a first urging member.

As illustrated in FIG. 7, a magnetic body 72 is disposed inside the body-side coupling 27 serving as a first coupling, and a magnet 71 that is a permanent magnet is disposed inside the cartridge-side coupling 26 serving as a second coupling. The magnet 71 and the magnetic body 72 are preferably disposed to overlap each other as viewed in the axial direction. As a result of attracting the magnetic body 72 by a magnetic force of the magnet 71, the body-side coupling 27 is urged toward the cartridge-side coupling 26 (−X direction) in the axial direction X.

According to the present embodiment, similarly to the first embodiment, more stable drive transmission can be performed between the apparatus body and the unit.

To be noted, although a magnet is disposed in the cartridge-side coupling 26 and a magnetic body is disposed in the body-side coupling 27 in the example illustrated in FIG. 7, the positions of the magnet and the magnetic body may be interchanged. In addition, a magnet may be disposed in each of the cartridge-side coupling 26 and the body-side coupling 27 such that different magnetic poles of the magnets face each other.

Fifth Embodiment

An image forming apparatus according to a fifth embodiment will be described. In the description below, it is assumed that elements denoted by the same reference signs as in the first embodiment have substantially the same configurations and functions as those described in the first embodiment, and parts different from the first embodiment will be mainly described.

Figure 8:
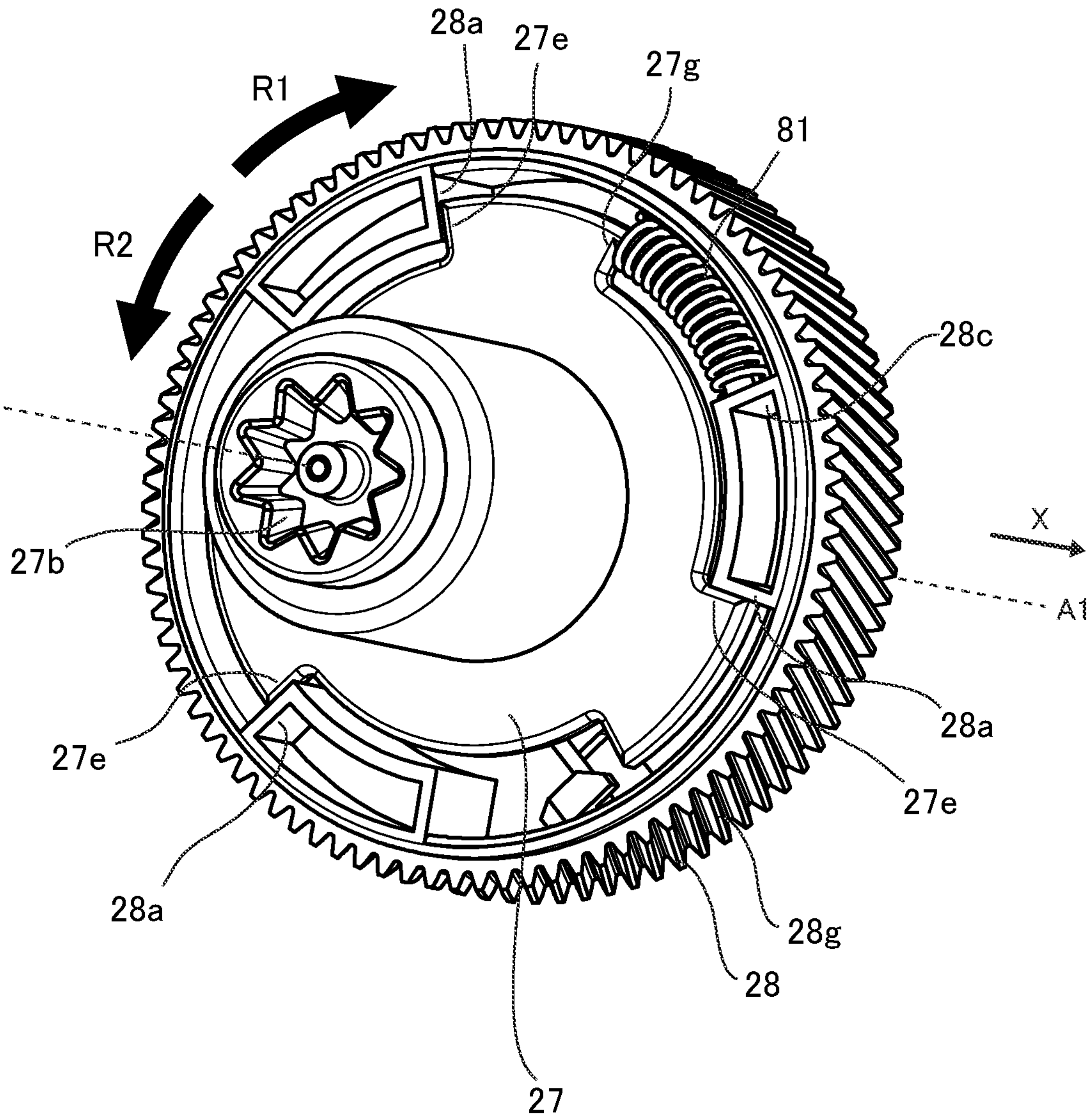
FIG. 8 is an explanatory diagram of an apparatus according to a fifth embodiment.

The present embodiment is different from the first embodiment in that a compression spring is used as the first urging member. FIG. 8 is a perspective view of the drive gear 28, the body-side coupling 27, and a compression spring 81 serving as a first urging member according to the present embodiment.

The compression spring 81 is provided in a compressed state between a spring reception portion 28*c* provided on the drive gear 28 and a spring reception portion 27*g* provided on the body-side coupling 27. The spring reception portion 28*c* of the drive gear 28 and the spring reception portion 27*g* of the body-side coupling 27 are surfaces facing each other in the rotation direction (driving direction R1) about the rotation axis A1.

To be noted, the drive gear 28 includes a first projection portion (projection portion projecting on the inner peripheral side of the gear portion 28*g*) having drive transmission surfaces 28*a* on the downstream side in the driving direction R1. The spring reception portion 28*c* of the drive gear 28 is a surface of the first projection portion on the upstream side in the driving direction R1. In addition, the body-side coupling 27 has a second projection portion having force receiving surfaces 27*e* on the upstream side in the driving direction R1. The spring reception portion 27*g* of the body-side coupling 27 is a surface of the second projection portion on the downstream side in the driving direction R1.

The compression spring 81 is disposed along an arc of a virtual circle centered on the rotation axis A1. The body-side coupling 27 is urged in the urging direction R2 opposite to the driving direction R1 with respect to the drive gear 28 by the urging force (restoration force) of the compression spring 81. That is, also in the present embodiment, the first coupling (body-side coupling 27) is urged in the second rotation direction (urging direction R2) by the compression spring 81 serving as a first urging member. As a result of this, the contact between the drive transmission surfaces 28*a* of the drive gear 28 and the force receiving surfaces 27*e* of the body-side coupling 27 is maintained, and an advantage similar to the first embodiment can be obtained.

According to the present embodiment, more stable drive transmission can be performed between the apparatus body and the unit similarly to the first embodiment.

Although an example in which the compression spring 81 is disposed at one position around the rotation axis A1 is illustrated in FIG. 8, for example, a plurality of compression springs 81 may be arranged at equal intervals in the rotation direction.

In addition, although a configuration in which the body-side coupling 27 is urged in the second rotation direction (urging direction R2) by the compression spring 81 has been described as an example in the present embodiment, a configuration in which the body-side coupling 27 is urged in the second rotation direction (urging direction R2) by a tension spring can be also employed.

Sixth Embodiment

An image forming apparatus according to a sixth embodiment will be described. In the description below, it is assumed that elements denoted by the same reference signs as in the first embodiment have substantially the same configurations and functions as those described in the first embodiment, and parts different from the first embodiment will be mainly described.

Figure 9:
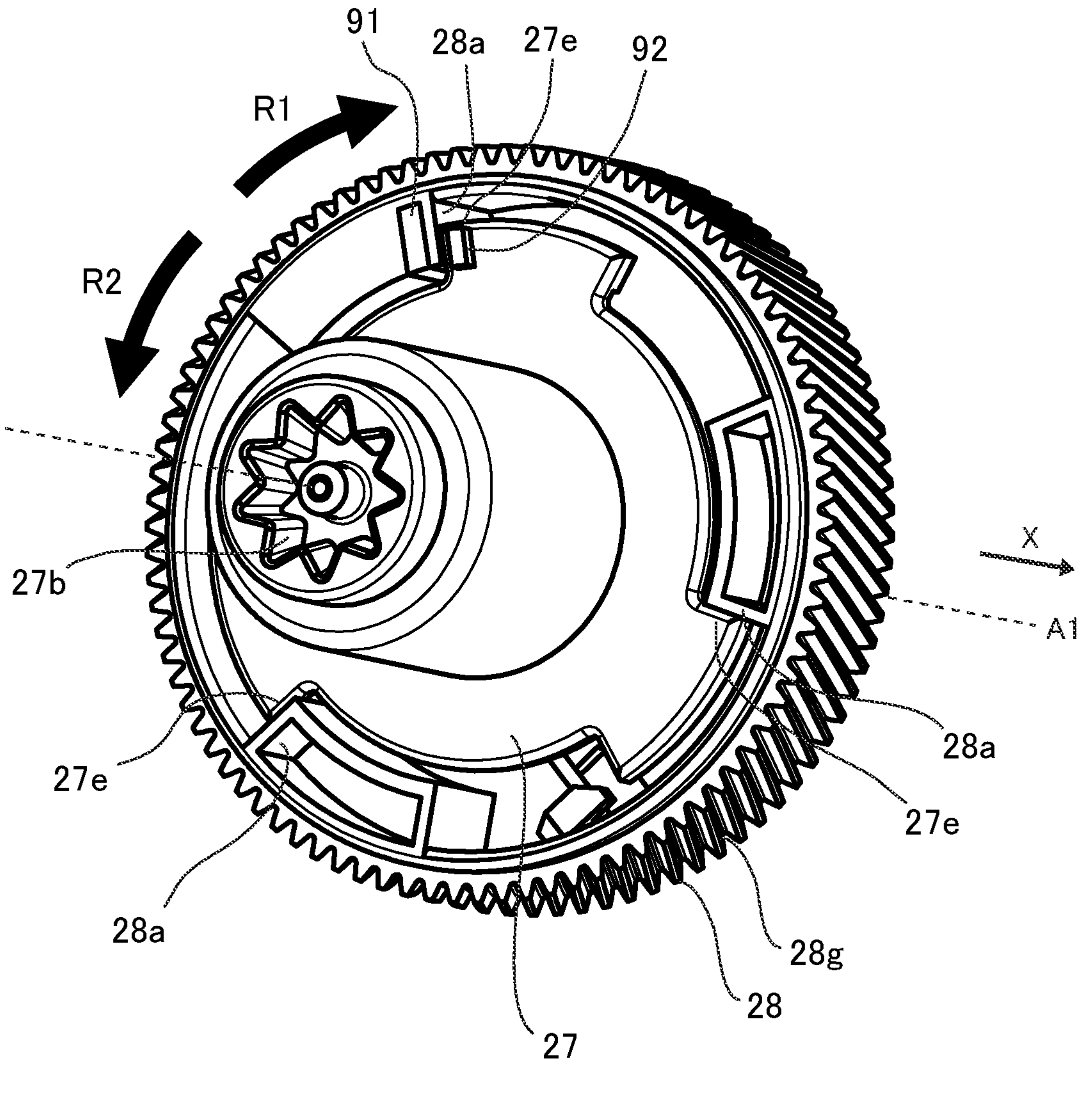
FIG. 9 is an explanatory diagram of an apparatus according to a sixth embodiment.

The present embodiment is different from the first embodiment in that a magnet is used as the first urging member. FIG. 9 is a perspective view of the drive gear 28 and the body-side coupling 27 according to the present embodiment. Similarly to the first embodiment, the body-side coupling 27 is urged toward the cartridge-side coupling 26 in the axial direction X by the thrust spring 29 serving as a second urging member.

As illustrated in FIG. 9, the drive gear 28 includes a magnet 91 (permanent magnet) disposed in the vicinity of at least one of the drive transmission surfaces 28*a*. The body-side coupling 27 includes a magnetic body 92 disposed in the vicinity of at least one of the force receiving surfaces 27*e*. As a result of the magnetic body 92 being attracted by the magnetic force of the magnet 91, the body-side coupling 27 is urged in the urging direction R2 opposite to the driving direction R1 of the drive gear 28. That is, also in the present embodiment, the first coupling (body-side coupling 27) is urged in the second rotation direction (urging direction R2) by the magnet 91 serving as a first urging member. As a result of this, the contact between the drive transmission surfaces 28*a* of the drive gear 28 and the force receiving surfaces 27*e* of the body-side coupling 27 is maintained, and an advantage similar to the first embodiment can be obtained.

According to the present embodiment, more stable drive transmission can be performed between the apparatus body and the unit similarly to the first embodiment.

To be noted, although an example in which the magnet 91 is disposed at one position around the rotation axis A1 is illustrated in FIG. 9, for example, a plurality of magnets 91 may be arranged at equal intervals in the rotation direction.

In addition, although a magnet is disposed in the drive gear 28 and a magnetic body is disposed in the body-side coupling 27 in the example illustrated in FIG. 9, the positions of the magnet and the magnetic body may be interchanged. In addition, a magnet may be disposed in each of the drive gear 28 and the body-side coupling 27 such that different magnetic poles of the magnets face each other.

Seventh Embodiment

An image forming apparatus according to a seventh embodiment will be described. In the description below, it is assumed that elements denoted by the same reference signs as in the first embodiment have substantially the same configurations and functions as those described in the first embodiment, and parts different from the first embodiment will be mainly described.

The present embodiment is different from the first embodiment in that the first urging member that urges the body-side coupling 27 in the rotation direction and the second urging member that urges the body-side coupling 27 in the axial direction are provided integrally as a single spring member.

Figure 10:
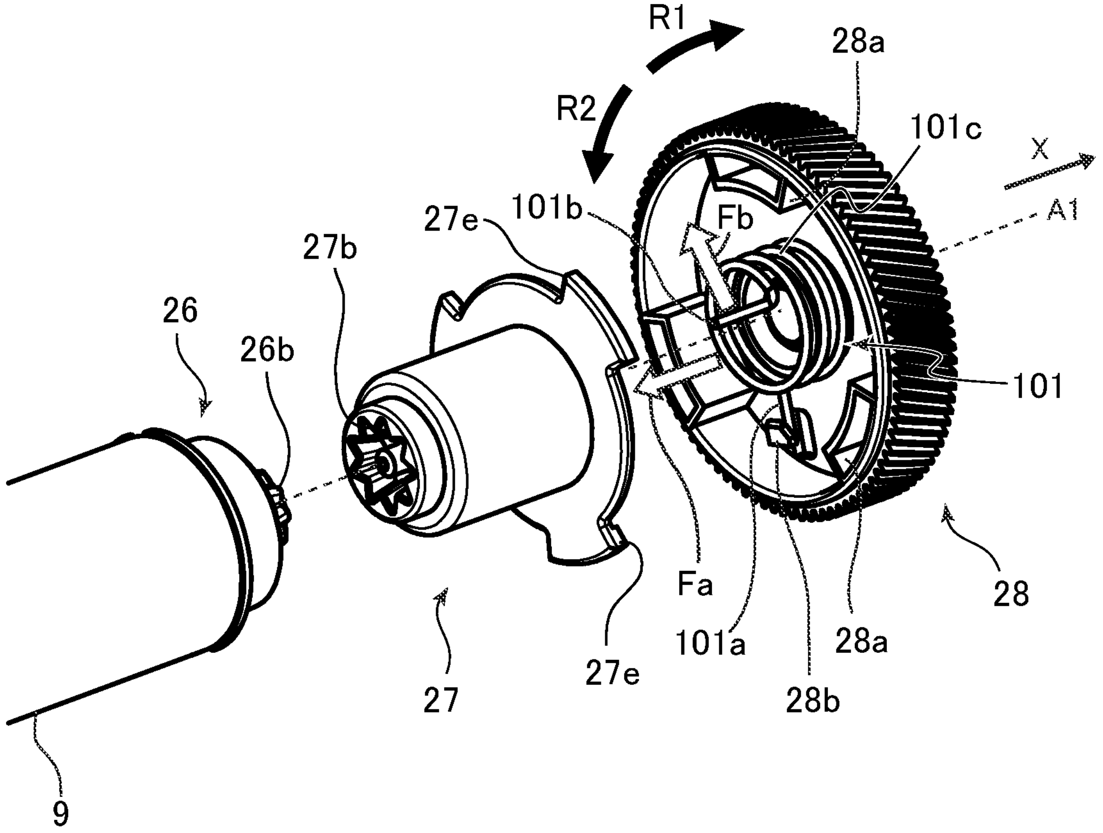
FIG. 10 is an explanatory diagram of an apparatus according to a seventh embodiment.

FIG. 10 is an exploded view of the coupling portion CP according to the present embodiment. The present embodiment includes a spring member 101 serving as both the first urging member and the second urging member. The spring member 101 includes a coil portion 101*c*, and arm portions 101*a* and 101*b* respectively projecting from the two ends of the coil portion 101*c*. One arm portion 101*a* is attached to the spring reception portion 28*b* provided on the drive gear 28, and the other arm portion 101*b* is attached to the spring reception portion 27*a* provided on the body-side coupling 27 illustrated in FIG. 2B.

In addition, the spring member 101 is disposed in such an orientation that the axial direction of the coil portion 101*c* is approximately parallel to the axial direction X. The coil portion 101*c* is provided in a compressed state between the drive gear 28 and the body-side coupling 27 in a state in which one end surface thereof in the axial direction X abuts the drive gear 28 and the other end surface thereof in the axial direction X abuts the body-side coupling 27.

The body-side coupling 27 is urged, by a force Fb of the arm portion 101*b* pressing the spring reception portion 27*a*, in the second rotation direction (urging direction R2) opposite to the first rotation direction (driving direction R1 of FIG. 3A) in which the drive gear 28 is driven by the driving force from the motor 21. That is, the spring member 101 functions as a first urging member that urges the first coupling in the second rotation direction.

In addition, the body-side coupling 27 is urged toward the cartridge-side coupling 26 in the axial direction X (−X direction) by a force Fa of an end surface of the coil portion 101*c* pressing the body-side coupling 27. That is, the spring member 101 functions as a second urging member that urges the first coupling toward the second coupling in the axial direction.

According to the present embodiment, similarly to the first embodiment, more stable drive transmission can be performed between the apparatus body and the unit.

In addition, in the present embodiment, since the first urging member and the second urging member are realized by a single spring member, the number of parts of the image forming apparatus can be reduced.

OTHER EMBODIMENTS

In the embodiments described above, a configuration in which the body-side coupling 27 (first coupling) is movable in the axial direction X with respect to the drive gear 28 (rotary member) is employed. As a result of this, by pressing the body-side coupling 27 against the cartridge-side coupling 26 by the second urging member, the gap between the couplings can be reduced. In addition, the interconnecting mechanism 34 can move the body-side coupling 27 between the engaging position and the disengaging position in an interconnected manner with the opening and closing of the front door 18.

However, the present technique is applicable in a case where the rotary member and the first coupling are formed as separate members. Therefore, a configuration in which the first coupling is moved in the axial direction for the purpose of realizing an operation different from the reduction of gap between the couplings or engagement and disengagement of the first coupling interconnected with the opening and closing of the front door 18 may be employed.

As an example, a configuration in which the first coupling can be moved between the engaging position and the disengaging position by an actuator such as a solenoid and the first coupling is positioned at the disengaging position in a period in which the driving target on the unit side does not need to be driven may be employed. In this case, advantages such as reduction of load on the drive source or improvement in the energy-saving property of the image forming apparatus can be obtained.

In the embodiments described above, a configuration in which the photosensitive drum 9 serving as a driving target on the unit side rotates about the rotation axis A1 shared with the rotary member on the apparatus side (drive gear 28) and the first coupling (body-side coupling 27) has been described as an example. However, for example, the driving target on the unit side may be a member that rotates about a rotation axis different from the rotation axis A1. In this case, a transmission mechanism such as a gear train that transmits a driving force from the second coupling to the driving target is disposed in the unit.

In the embodiments described above, a configuration in which the photosensitive drum 9 is rotationally driven by a driving force that the cartridge-side coupling 26 receives the body-side coupling 27 has been described. However, the driving target to which the present technique can be applied is not limited to the photosensitive drum 9.

For example, the developing roller 11 illustrated in FIG. 1 may be driven by the driving force that the cartridge-side coupling 26 receives from the body-side coupling 27. In this case, the driving force received by the cartridge-side coupling 26 may be distributed to the developing roller 11 via a gear train or the like to simultaneously drive the photosensitive drum 9 and the developing roller 11. In addition, the developing roller 11, the body-side coupling 27, and the drive gear 28 may be made coaxial by providing the cartridge-side coupling 26 at an end portion of the developing roller 11 and disposing the developing roller 11 on the rotation axis A1.

In addition, although the process cartridge 8 is described as an example of a unit attachable to and detachable from the apparatus body of the image forming apparatus in the embodiments described above, the unit to which the present technique is applicable is not limited to this. For example, in an image forming apparatus of an intermediate transfer system, a unit including an intermediate transfer member may be configured to be attachable to and detachable from the apparatus body. The intermediate transfer member is a member that bears an image transferred from an image bearing member through primary transfer and conveys the image to transfer the image onto a recording material through secondary transfer, and for example, an endless belt (intermediate transfer belt) stretched over a plurality of rollers including a driving roller is used as the intermediate transfer member. In this case, the driving roller (driving target) of the intermediate transfer belt may be rotationally driven by a driving force that a coupling having the same configuration as the cartridge-side coupling 26 receives from the body-side coupling 27.

Further, the driving target is not limited to those described above, and for example, the driving target may be a conveyance roller provided in a conveyance unit for conveying a recording material.

In addition, a monochromatic laser beam printer of an intermediate transfer system illustrated in FIG. 1 has been described as an example of the image forming apparatus in the embodiments described above. The configuration is not limited to this, and the technique of the present disclosure may be applied to an image forming apparatus of an intermediate transfer system, or an image forming apparatus that forms a color image by using developers (toners) of a plurality of colors. Further, the present technique may be applied to an image forming portion of a system different from an electrophotographic system such as an inkjet system or an offset printing system. To be noted, the "image forming apparatus" is not limited to a monofunctional printer, and examples thereof include copiers, multifunctional apparatuses, and commercial printers.

According to the present disclosure, an image forming apparatus capable of more stable drive transmission can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-152609, filed on Sep. 26, 2022, which is hereby incorporated by reference herein in its entirety.

What is claimed is:

1. An image forming apparatus comprising:

an apparatus body including a drive source configured to supply a driving force, a rotary member configured to be rotated in a first rotation direction about a rotation axis by the driving force, and a first coupling rotatable about the rotation axis and movable in an axial direction of the rotation axis with respect to the rotary member; and a unit attachable to and detachable from the apparatus body, the unit including a second coupling configured to receive the driving force by engaging with the first coupling, wherein the rotary member includes an abutting portion, wherein the first coupling includes an abutted portion configured to be abutted with the abutting portion, and is configured to rotate in the first rotation direction together with the rotary member in a case where the abutting portion presses the abutted portion, and wherein the apparatus body further includes a first urging member configured to urge the first coupling in a second rotation direction opposite to the first rotation direction so that contact between the abutted portion and the abutting portion is maintained by an urging force of the first urging member.

2. The image forming apparatus according to claim 1, further comprising:

a second urging member configured to urge the first coupling toward the second coupling in the axial direction.

3. The image forming apparatus according to claim 2, wherein the first coupling includes an engaging portion, wherein the second coupling includes an engaged portion configured to engage with the engaging portion to receive the driving force from the first coupling, and wherein the engaging portion and the engaged portion are pressed against each other in the axial direction by an urging force of the second urging member such that relative positions of the first coupling and the second coupling in the first and second rotation directions are determined.

4. The image forming apparatus according to claim 2, wherein the second urging member is a compression spring disposed along the rotation axis.

5. The image forming apparatus according to claim 2, wherein the second urging member is one or more magnets provided to at least one of the first coupling and second coupling and configured to cause the first coupling and the second coupling to be attracted to each other by a magnetic force.

6. The image forming apparatus according to claim 2, wherein the first urging member and the second urging member are provided integrally as a single spring member.

7. The image forming apparatus according to claim 1, further comprising:

an opening/closing member movable between a closed position where the opening/closing member closes an opening of the apparatus body, and an open position where the opening is exposed such that attachment and detachment of the unit via the opening is allowed; and an interconnecting mechanism configured to, in an interconnected manner with an operation of moving the opening/closing member from the closed position to the open position, move the first coupling from an engaging position where the first coupling engages with the second coupling to a disengaging position where the first coupling disengages from the second coupling.

8. The image forming apparatus according to claim 7, wherein the interconnecting mechanism includes a rotary cam disposed on an outer peripheral side of the first coupling in a rotation radius direction of the first coupling and configured to rotate about the rotation axis, a link configured to couple the rotary cam and the opening/closing member and rotate the rotary cam in an interconnected manner with movement of the opening/closing member, and a fixed member having a cam surface configured to move the rotary cam in the axial direction in accordance with a rotational angle of the rotary cam.

9. The image forming apparatus according to claim 7, wherein the first coupling is configured to move from the engaging position to the disengaging position while maintaining a state in which the abutting portion is in contact with the abutted portion.

10. The image forming apparatus according to claim 1, wherein the rotary member is configured not to move in the axial direction.

11. The image forming apparatus according to claim 10, wherein the apparatus body includes a stepped gear including a large-diameter gear portion coupled to the drive source and a small-diameter gear portion having a smaller outer diameter than the large-diameter gear portion and configured to engage with a gear portion of the rotary member.

12. The image forming apparatus according to claim 11, wherein the apparatus body further includes a support member configured to rotatably support the stepped gear, and wherein the stepped gear is disposed such that part of the large-diameter gear portion is positioned between the support member and the rotary member in the axial direction.

13. The image forming apparatus according to claim 1, wherein the apparatus body further includes a shaft member extending in the axial direction and configured to support the rotary member and the first coupling, and wherein the shaft member is inserted in a first hole portion provided in the rotary member and a second hole portion provided in the first coupling.

14. The image forming apparatus according to claim 1, wherein the unit includes a driving target configured to be rotationally driven about the rotation axis by the driving force.

15. The image forming apparatus according to claim 1, wherein the first urging member is a torsion coil spring having one end coupled to the rotary member and another end coupled to the first coupling.

16. The image forming apparatus according to claim 1, wherein the first urging member is a compression spring disposed along an arc centered on the rotation axis.

17. The image forming apparatus according to claim 1, wherein the first urging member is a magnet configured to cause the rotary member and the first coupling to be attracted to each other by a magnetic force.

18. The image forming apparatus according to claim 1, wherein the rotary member is a gear configured to receive the driving force via another gear.

19. The image forming apparatus according to claim 1, wherein the rotary member is a pulley configured to receive the driving force via a belt.

20. The image forming apparatus according to claim 1, wherein the drive source is a motor disposed to be coaxial with the rotary member.

21. The image forming apparatus according to claim 1, wherein the unit includes an image bearing member configured to bear an image to be formed on a recording material, wherein the image bearing member is configured to rotate by receiving the driving force via the second coupling, and wherein the image forming apparatus is configured to form the image on the recording material by using the image bearing member.

22. The image forming apparatus according to claim 1, wherein the unit includes a developing roller configured to supply developer to an image bearing member, and wherein the developing roller is configured to rotate by receiving the driving force via the second coupling.

23. The image forming apparatus according to claim 1, wherein the first coupling is movable in the axial direction of the rotation axis with respect to the rotary member so that the first coupling is away from the second coupling while maintaining a state in which the abutting portion is in contact with the abutted portion.

24. The image forming apparatus according to claim 1, wherein in a case where the second coupling disengages from the first coupling, a state in which the abutting portion is in contact with the abutted portion is maintained.

* * * * *